V. B. RYERSON.
Amalgamator and Concentrator.
No. 53,885.  Patented April 10, 1866.
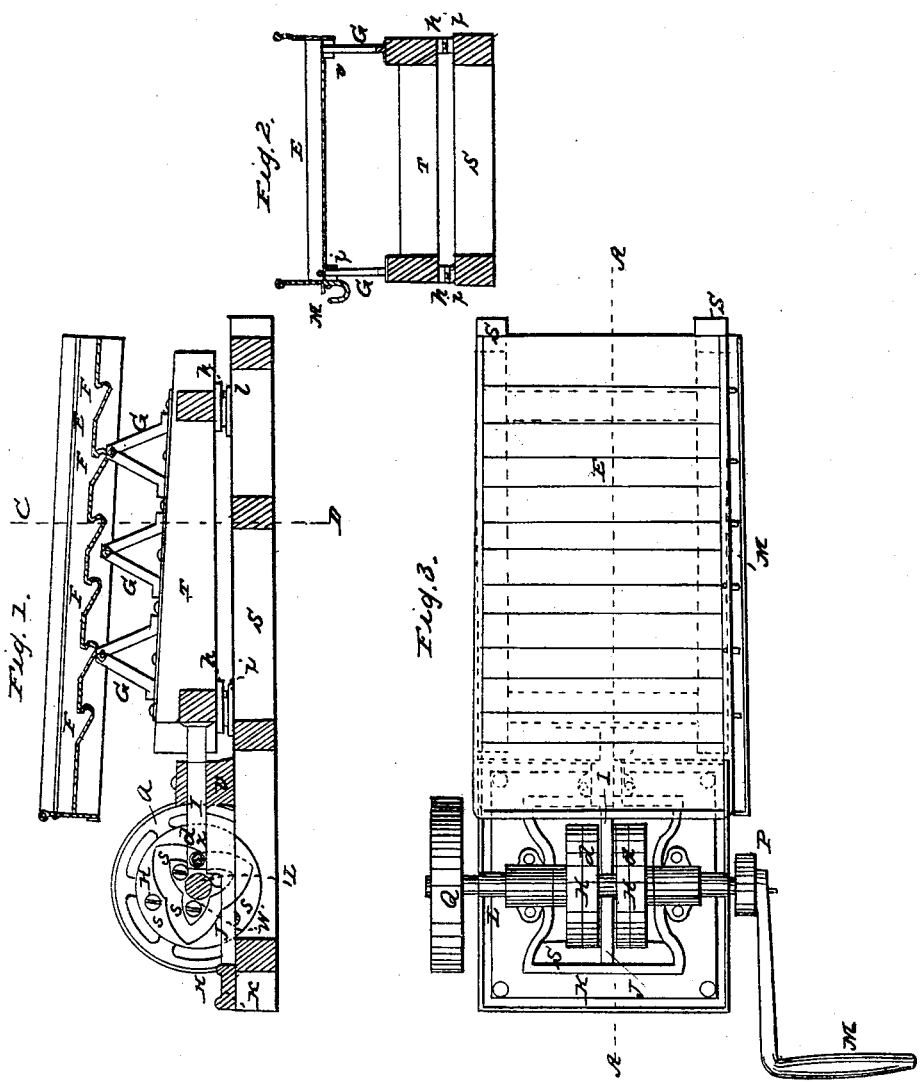

UNITED STATES PATENT OFFICE.

VAN BUREN RYERSON, OF NEW YORK, N. Y.

IMPROVEMENT IN APPARATUS FOR SEPARATING THE PRECIOUS METALS FROM OTHER SUBSTANCES.

Specification forming part of Letters Patent No. 53,885, dated April 10, 1866.

*To all whom it may concern:*

Be known that I, VAN BUREN RYERSON, of the city, county, and State of New York, have invented certain new and useful Improvements in Apparatus for Separating Gold and other Precious Metals from the Substances with which They are Mixed; and I do hereby declare that the following is a full, clear, and exact description thereof, reference being had to the accompanying drawings, making part of this specification, in which—

Figure 1 is a longitudinal vertical section; Fig. 2, a cross vertical section, and Fig. 3 a plan.

The same letters indicate like parts in all the figures.

The object of my said invention is to separate gold and other precious metals from other substances with which they are mixed, and to effect such separation whether the metals to be obtained be in admixture with sand or with crushed and pulverized rock, and whether before or after amalgamation with mercury; and my said invention is also applicable to the separation of other substances, such as ores which are of considerably greater specific gravity than the gangue in which they are found embedded, and which have to be crushed preparatory to the process of separation.

The material containing the particles of metal or other substances to be collected, and termed by miners "débris," is discharged with a stream of water from a suitable vessel onto a pan, E, near the upper end thereof. This pan I prefer to make of copper with the upper surface galvanized, as separating-pans are usually galvanized. It is made with parallel sides and ends, as represented, and attached, by brackets G, to a carriage or sliding frame, T, which slides in suitable ways *i h* on a bed-frame, S. One end of the carriage T is provided with a rigid connecting-rod, I, provided at its outer end with two rollers, *d d*, one on each side fitted to cam grooves formed in the inner faces of two wheels, H H, on a main shaft mounted in suitable bearings on the bed-frame, and to be driven by any suitable motor. The form of the said cam-grooves is represented in Fig. 1 of the drawings, and they will give to the carriage and pan E three back-and-forth motions to each rotation of the shaft, and, by reason of their peculiar form, the reciprocating motions imparted, instead of being gradually started and gradually arrested, as if derived from a crank or an eccentric, are started and stopped suddenly. The importance of this sudden starting and stopping of the reciprocating motion of the pan will be explained in describing the operation.

The general plane of the bottom of the pan is slightly inclined, as represented, and it is formed with a series of recesses, F, extending in straight and parallel lines across the pan. The bottom of each recess, in the direction of the length of the pan, is of greater inclination than the general plane of the pan by about thirty degrees, and the extreme forward part of each recess is in the form of a segment of a hollow cylinder, which extends up to the general plane of the bottom. These recesses I prefer to make at equal distances apart, and making the spaces between any two about equal to the extent of each recess, measuring in the direction of the length of the pan.

The material to be separated and the stream of water are discharged onto the surface of the pan near the rear or more elevated end, and while the pan is being reciprocated at the rate of about one hundred and thirty strokes per minute.

The mode of operation, or the mechanical law of my said invention by which the particles of considerable specific gravity are separated from the particles of materially less specific gravity, is now to be explained. If the bottom of the pan was flat and inclined and without recesses of any kind, the material and water discharged onto it would be carried down the plane by a series of reciprocating motions of greater range toward the lower than toward the higher end of the pans, because in one direction the reciprocating motion of the pan in overcoming the inertia of the material would be aided by the force of gravity of the said material, while in the opposite direction the inertia and gravity must be both overcome; and to these forces which give a downward preponderance is to be added the force of the current of water. Now, the desideratum is to cause the water to wash out, separate, and carry down all the matters of less specific gravity than the particles of gold or other material to be collected. As the material travels down from the receiving toward the delivery end under the impulse given by the motion of the pan, when it reaches the first recess the particles to be collected, by reason of their superior gravity, run down the inclined bottom of the recess, and on reaching the curved part thereof are thrown backward and upward in curved lines by the back motion of the pan, and when thus thrown upward and backward any particles of lighter material that may have followed the heavy particles are again and favorably resubjected to the separating action and to the downward current of water, by which they are finally discharged at the lower end of the pan. Any particles of the material to be collected which, by contact with or adherence to particles of lighter material, are carried by the general current beyond the first recess will be caught and retained by some of the other recesses and preserved.

What I claim as my invention, and desire to secure by Letters Patent, is—

The pan with the bottom formed with recesses substantially of the form herein described, in combination with the means, or the equivalent thereof, for giving reciprocating motions, substantially such as described.

V. B. RYERSON.

Witnesses:
ANDREW DE LACY,
WM. H. BISHOP.